United States Patent
Ogut et al.

(10) Patent No.: US 8,581,480 B2
(45) Date of Patent: *Nov. 12, 2013

(54) SELF-REGENERATING PARTICULATE TRAP SYSTEMS FOR EMISSIONS AND METHODS THEREOF

(75) Inventors: Ali Ogut, Pittsford, NY (US); Cheng Chen, Fort Wayne, IN (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,104

(22) Filed: Sep. 2, 2011

(65) Prior Publication Data

US 2011/0315891 A1 Dec. 29, 2011

Related U.S. Application Data

(63) Continuation of application No. 11/480,059, filed on Jun. 30, 2006, now Pat. No. 8,115,373.

(60) Provisional application No. 60/696,978, filed on Jul. 6, 2005.

(51) Int. Cl.
*H01J 1/02* (2006.01)

(52) U.S. Cl.
USPC .............................. 313/309; 445/51

(58) Field of Classification Search
USPC .............................. 313/633, 309–311; 445/51
See application file for complete search history.

(56) References Cited

U.S. PATENT DOCUMENTS

| | | | |
|---|---|---|---|
| 3,945,948 A | 3/1976 | Westwood et al. | |
| 3,951,860 A | 4/1976 | Acres et al. | |
| 3,959,690 A * | 5/1976 | Leibrecht | 361/230 |
| 3,963,827 A | 6/1976 | Acres et al. | |
| 3,972,837 A | 8/1976 | Acres et al. | |
| 3,985,854 A | 10/1976 | Bradford et al. | |
| 4,025,606 A | 5/1977 | Acres | |
| 4,053,556 A | 10/1977 | Acres | |
| 4,070,157 A | 1/1978 | Iles | |
| 4,074,865 A | 2/1978 | Gibbon | |
| 4,077,913 A | 3/1978 | Acres et al. | |

(Continued)

OTHER PUBLICATIONS

Dockery et al., "As Association Between Air Pollution and Mortality in Six Us Cites," *New England J. Med.* 329(24):1753-1759 (1993).

(Continued)

*Primary Examiner* — Anne Hines
(74) *Attorney, Agent, or Firm* — Joseph M. Noto; Bond Schoeneck & King, PLLC (57) ABSTRACT

A method and system for treating emissions includes charging particles in an exhaust stream, producing one or more radicals, and oxidizing at least a portion of the charged particles with at least a portion of the produced radicals. At least a portion of the charged particles in the exhaust stream are then attracted on at least one attraction surface which is one of oppositely charged from the charged particles and grounded. The attracted particles are oxidized with another portion of the one or more produced radicals to self regenerate the at least one attraction surface. Downstream from where the attracted particles are oxidized, at least a portion of one or more first compounds in the exhaust stream are converted to one or more second compounds downstream from the attracting. Additionally, at least a portion of any remaining charged particles are oxidized into one or more gases.

21 Claims, 6 Drawing Sheets

(56) References Cited

U.S. PATENT DOCUMENTS

| | | |
|---|---|---|
| 4,089,810 A | 5/1978 | Diwell et al. |
| 4,122,370 A | 10/1978 | Barnes |
| 4,123,500 A | 10/1978 | Acres et al. |
| 4,127,510 A | 11/1978 | Harrison et al. |
| 4,130,506 A | 12/1978 | Collier et al. |
| 4,162,235 A | 7/1979 | Acres et al. |
| 4,163,736 A | 8/1979 | Acres et al. |
| 4,169,126 A | 9/1979 | Iles |
| 4,180,477 A | 12/1979 | Barnes |
| 4,197,217 A | 4/1980 | Gartshore et al. |
| 4,222,025 A | 9/1980 | Iles et al. |
| 4,227,894 A * | 10/1980 | Proynoff ......................... 96/58 |
| 4,228,138 A | 10/1980 | Sermon |
| 4,237,032 A | 12/1980 | Evans et al. |
| 4,254,739 A | 3/1981 | Enga |
| 4,257,223 A | 3/1981 | Enga |
| 4,274,877 A | 6/1981 | Collier et al. |
| 4,285,665 A | 8/1981 | Enga |
| 4,287,856 A | 9/1981 | Enga |
| 4,288,346 A | 9/1981 | Hunter et al. |
| 4,289,652 A | 9/1981 | Hunter et al. |
| 4,289,737 A | 9/1981 | Acres et al. |
| 4,324,700 A | 4/1982 | Heffer |
| 4,349,450 A | 9/1982 | Hunter |
| 4,362,655 A | 12/1982 | Jenkins |
| 4,364,727 A | 12/1982 | Enga |
| 4,378,783 A | 4/1983 | Hunter |
| 4,384,549 A | 5/1983 | Enga |
| 4,389,983 A | 6/1983 | Enga et al. |
| 4,418,215 A | 11/1983 | Jenkins |
| 4,428,768 A | 1/1984 | Day |
| 4,433,064 A | 2/1984 | Pignon |
| 4,464,482 A | 8/1984 | Bird et al. |
| 4,478,797 A | 10/1984 | Diwell et al. |
| 4,500,650 A | 2/1985 | Wyatt et al. |
| 4,509,327 A | 4/1985 | Enga |
| 4,521,890 A | 6/1985 | Burnham et al. |
| 4,537,839 A | 8/1985 | Cameron |
| 4,539,311 A | 9/1985 | Harrison et al. |
| 4,695,437 A | 9/1987 | Jung |
| 4,695,438 A | 9/1987 | Becker et al. |
| 4,780,445 A | 10/1988 | Jung |
| 4,782,039 A | 11/1988 | Lindsey |
| 4,798,817 A | 1/1989 | Becker et al. |
| 4,849,185 A | 7/1989 | Wittig |
| 4,902,487 A | 2/1990 | Cooper et al. |
| 4,906,466 A | 3/1990 | Edwards et al. |
| 4,996,180 A | 2/1991 | Diwell et al. |
| 5,169,604 A | 12/1992 | Crothers, Jr. |
| 5,316,990 A | 5/1994 | Cooper et al. |
| 5,413,788 A | 5/1995 | Edwards et al. |
| 5,478,528 A | 12/1995 | Golunski et al. |
| 5,480,854 A | 1/1996 | Rajaram et al. |
| 5,516,741 A | 5/1996 | Gascoyne et al. |
| 5,716,437 A | 2/1998 | Denton et al. |
| 5,776,417 A | 7/1998 | Frost et al. |
| 5,792,444 A | 8/1998 | Fischman et al. |
| 5,795,669 A | 8/1998 | Wilkinson et al. |
| 5,877,377 A | 3/1999 | Golunski et al. |
| 5,939,028 A | 8/1999 | Bennett et al. |
| 5,939,220 A | 8/1999 | Gunner et al. |
| 5,943,857 A | 8/1999 | Ansell et al. |
| 5,993,621 A | 11/1999 | Liu |
| 5,993,762 A | 11/1999 | Rajaram et al. |
| 6,022,825 A | 2/2000 | Andersen et al. |
| 6,024,938 A | 2/2000 | Corbo et al. |
| 6,155,073 A | 12/2000 | Gray |
| 6,294,141 B1 | 9/2001 | Twigg et al. |
| 6,302,977 B1 | 10/2001 | Liu |
| 6,342,192 B1 | 1/2002 | Andersson et al. |
| 6,413,483 B1 | 7/2002 | Brisley et al. |
| 6,427,436 B1 | 8/2002 | Allansson et al. |
| 6,477,831 B1 | 11/2002 | Ballinger et al. |
| 6,479,023 B1 | 11/2002 | Evans et al. |
| 6,485,856 B1 | 11/2002 | Brown et al. |
| 6,488,904 B1 | 12/2002 | Cox et al. |
| 6,546,717 B1 | 4/2003 | Chandler et al. |
| 6,557,340 B1 | 5/2003 | Twigg et al. |
| 6,599,570 B1 | 7/2003 | Aderhold et al. |
| 6,617,276 B1 | 9/2003 | Ballinger et al. |
| 6,625,976 B1 | 9/2003 | Andersen et al. |
| 6,634,169 B1 | 10/2003 | Andersen et al. |
| 6,645,439 B2 | 11/2003 | Zhang et al. |
| 6,651,424 B1 | 11/2003 | Twigg |
| 6,677,073 B1 | 1/2004 | Brown et al. |
| 6,680,036 B1 | 1/2004 | Fisher et al. |
| 6,680,037 B1 | 1/2004 | Allansson et al. |
| 6,692,712 B1 | 2/2004 | Andersen |
| 6,696,031 B1 | 2/2004 | Twigg et al. |
| 6,713,030 B1 | 3/2004 | Chandler et al. |
| 6,753,294 B1 | 6/2004 | Brisley et al. |
| 6,756,338 B2 | 6/2004 | Koo et al. |
| 6,772,584 B2 | 8/2004 | Chun et al. |
| 6,775,972 B2 | 8/2004 | Twigg et al. |
| 6,805,849 B1 | 10/2004 | Andreasson et al. |
| 6,818,193 B2 | 11/2004 | Christodoulatos et al. |
| 6,855,452 B1 | 2/2005 | Cooper et al. |
| 6,857,265 B2 | 2/2005 | Twigg et al. |
| 6,863,874 B1 | 3/2005 | Twigg |
| 6,877,313 B1 | 4/2005 | Phillips et al. |
| 6,878,471 B1 | 4/2005 | Burch et al. |
| 6,887,455 B2 | 5/2005 | Carpenter et al. |
| 6,889,498 B1 | 5/2005 | Chandler et al. |
| 6,927,189 B1 | 8/2005 | De Alvaro et al. |
| 6,936,370 B1 | 8/2005 | Knights et al. |
| 6,948,308 B2 | 9/2005 | Chandler et al. |
| 6,949,308 B2 | 9/2005 | Gascoyne et al. |
| 6,969,693 B2 | 11/2005 | Sauvage et al. |
| 6,978,601 B1 | 12/2005 | Twigg |
| 7,010,087 B2 | 3/2006 | Robins |
| 7,049,025 B2 | 5/2006 | Cooper et al. |
| 7,052,792 B2 | 5/2006 | Gascoyne et al. |
| 7,087,652 B2 | 8/2006 | Abbott et al. |
| 7,097,817 B2 | 8/2006 | Brisley et al. |
| 7,111,453 B2 | 9/2006 | Chandler et al. |
| 2001/0018519 A1 | 8/2001 | Sebastian |
| 2003/0119668 A1 | 6/2003 | Lok et al. |
| 2003/0144544 A1 | 7/2003 | Baker et al. |
| 2003/0208083 A1 | 11/2003 | Gabriel et al. |
| 2004/0049049 A1 | 3/2004 | Jurayj et al. |
| 2004/0147395 A1 | 7/2004 | Lok |
| 2005/0065025 A1 | 3/2005 | Lok et al. |
| 2005/0080146 A1 | 4/2005 | Abbott et al. |
| 2005/0151121 A1 | 7/2005 | Buche et al. |
| 2005/0266987 A1 | 12/2005 | Lok et al. |
| 2005/0272827 A1 | 12/2005 | Lok |
| 2006/0062706 A1 | 3/2006 | Ward |
| 2006/0094909 A1 | 5/2006 | Brown |

OTHER PUBLICATIONS

Ekchian et al., "Use of Non-Thermal Plasma Generated by a Corona Discharge Device (CDD) to Improve the Efficiency of a 3-Way Catalyst," *Fuel Economy & After-Treatment Development*, vol. 9 (1999).

Nair et al., "Non-Thermal Plasma for Biomass Tar Removal," Presented at AIChE National Meeting, pp. 1-6 (2004).

Nair, S.A., "Corona Plasma for Tar Removal," pp. 1-137 (2004).

Penetrante et al., "Feasibility of Plasma Aftertreatment for Simultaneous Control of $NO_x$ and Particulates," *SAE Technical Papers*, 1999-01-3637, pp. 1-6 (1999).

Pope III, C.A. "Epidemiological Evidence of Health Effects of Combustion-Source Particulate Air Pollution," in Proceed of the 1997 DEER Workshop, pp. 61-70 (1997).

Thomas et al., "Non Thermal Plasma Aftertreatment of Particulates—Theoretical Limits and Impact of Reactor Design," *SAE Technical Papers*, 2000-01-1926, pp. 1-13 (2000).

\* cited by examiner

FIG. 7 ated. For example, non-thermal plasma-assisted catalytic
SELF-REGENERATING PARTICULATE TRAP SYSTEMS FOR EMISSIONS AND METHODS THEREOF This application is a continuation of U.S. patent application Ser. No. 11/480,059, filed Jun. 30, 2006, which claims the benefit of U.S. Provisional Patent Application Ser. No. 60/696,978, filed Jul. 6, 2005, which is hereby incorporated by reference in its entirety.

FIELD OF THE INVENTION

The present invention generally relates to emissions treatment systems and methods thereof and, more particularly, to a self regenerating particulate trap system for one or more emissions and methods thereof.

BACKGROUND

There is a growing demand for energy usage in the United States, primarily due to increasing economic activity. This increasing demand for energy is being met by pursuing increased power generation. Unfortunately, this increase in power generation is resulting in the generation of over 160,000 tons of particulate emissions per year in the United States polluting the air.

Without significant new controls and treatments of emissions, millions of individuals will continue to breathe air polluted by these particulate emissions. Additionally, these emissions will continue to cause damage to environment in the form of acid rain and smog. Significant reductions in emissions of nitrogen oxides (NOx), particulate matter, non-methane hydrocarbons, carbon monoxide, sulfur dioxide, and other toxins would result in substantial benefits to both the public health and the environment.

At the present time a device that is robust, efficient, durable, packagable, and maintenance-free is not available for elimination of particulate matter. For diesel engines in particular, several devices have been designed to combat the problem of particulate emissions. Most of these devices use different filtration technologies with either thermal regeneration capabilities or manually replaceable filtration media. The problem with these filtration devices is that they quickly clog and increase the exhaust backpressure thus negatively affecting efficiency and performance. In addition thermal regeneration requires vast amounts of energy and produces very high temperatures.

As discussed below, other technologies available for separating particulate matter from a gas stream have been investigated. For example, non-thermal plasma-assisted catalytic reduction of exhaust gases using a corona discharge have been studied and reported in the literature. J. A. Ekchian, E. N. Balles, D. L. Christeller, J. S. Cowart, and W. D. Fuller, "Use of Non-Thermal Plasma Generated by a Corona Discharge Device to Improve the Efficiency of Three-Way Catalyst", which is herein incorporated by reference in its entirety, disclosed testing on the use of a corona discharge device for the reduction of HC, CO, and NOx in tailpipe emissions in conjunction with a three-way automotive catalyst and reported significant improvements.

Additionally, M. B. Penetrante, R. M. Brusasco, B. T. Merritt, W. J. Pitz and G. E. Wogtlin, "Feasibility of Plasma Aftertreatment for Simultaneous Control of NOx and Particulates". SAE Paper 1999-01-3637 (1999)", which is herein incorporated by reference in its entirety, disclosed a study on the feasibility of plasma after treatment of NOx and particulates. This study reported that although $NO_2$ can be used to non-thermally oxidize the carbon fraction of particulates, this does not provide a high level of reduction of NOx since it also leads to conversion of NO to $NO_2$.

Further, Suzanne E. Thomas, Anthony R. Martin, David Raybone, James T. Shawcross, Ka Lok Ng, Phil Beech, and J. Christopher Whitehead., "Non-Thermal Plasma After Treatment of Particulates-Theoretical Limits and Impact on Reactor Design", SAE Paper 2000-01-1926 (2000), which is herein incorporated by reference in its entirety, disclosed work that was carried out using non-thermal plasma by introducing packing material into the plasma region to increase the residence time for the oxidation of particulate matter in the treatment of diesel exhaust. This reference showed that a non-thermal plasma reactor designed in this manner could be effective in the oxidation of particulate matter at low temperatures. This reference also reported that a two-stage plasma system might be needed to convert NO, produced during the process, back to $NO_2$ upstream of a catalytic treatment. This reference indicated that the plasma in combination with a catalyst would be required to take care of aldehydes and CO.

Unfortunately, each of the technologies still has one or more limitations which prevent it from providing a robust, efficient, durable, packagable, and maintenance-free, particulate trap system and method.

SUMMARY

A method for treating emissions in accordance with embodiments of the present invention includes charging particles in an exhaust stream, producing one or more radicals, oxidizing at least a portion of the charged particles with at least a portion of the produced radicals. At least a portion of the charged particles in the exhaust stream are attracted on at least one attraction surface which is one of oppositely charged from the charged particles and grounded. The attracted particles are oxidized with another portion of the one or more produced radicals to self regenerate the at least one attraction surface.

A system for treating emissions in accordance with other embodiments of the present invention includes a housing with a passage having at least one inlet and at least one outlet, at least one charging system, and at least one attraction system. The charging system charges particles in an exhaust stream in the passage, produces one or more radicals, and oxidizes at least a portion of the charged particles with at least a portion of the produced radicals. The attraction system attracts at least a portion of the charged particles in the exhaust stream on at least one attraction surface which is one of oppositely charged from the charged particles and grounded in the passage downstream from the charging system. The attracted particles on the at least one attraction surface are oxidized with another portion of the one or more produced radicals to self regenerate the attraction surface.

A method for making a system for treating emissions in accordance with other embodiments of the present invention includes providing a housing with a passage having at least one inlet and at least one outlet, providing at least one charging system, and providing at least one attraction system in the passage downstream from the charging system. The charging system charges particles in the passage, produces one or more radicals in an exhaust stream, and oxidizes at least a portion of the charged particles with at least a portion of the produced radicals. The attraction system attracts at least a portion of the charged particles in the exhaust stream on at least one attraction surface which is one of oppositely charged from the charged particles and grounded. The attracted particles on the at least one attraction surface are oxidized with another portion of the one or more produced radicals to self regenerate the attraction surface.

A corona discharge device in accordance with embodiments of the present invention includes at least one conductive member and a plurality of teeth along at least one edge of the at least one conductive member. At least one electrical connector is coupled to the at least one conductive member.

A method for making a corona discharge device in accordance with other embodiments of the present invention includes includes providing at least one conductive member and forming a plurality of teeth along at least one edge of the at least one conductive member. At least one electrical connector is coupled to the at least one conductive member.

A method of making corona discharge in accordance with other embodiments of the present invention includes providing at least one conductive member with a plurality of teeth along at least one edge and coupling the at least one conductive member to at least one power source. A voltage from the power source is applied to the at least one conductive member to generate an ionization discharge.

The present invention provides systems and methods for elimination of particulate matter that are robust, efficient, durable, packagable, and maintenance-free. With the present invention, air quality is improved through significant annual reductions of particulate emissions providing benefits to public health and the environment. By using non-thermal plasma, the present invention is very efficient in terms of power consumption when compared to other prior particle separation and trapping technologies. Additionally, by self oxidizing carbon particulates the present invention is able to self regenerate the catalyzed electrostatic surface. Further, the present invention provides a treatment system which has a lower weigh, and lower system pressure drop than prior units.

DETAILED DESCRIPTION

An emissions treatment system 10 in accordance with embodiments of the present invention is illustrated in FIGS. 1-4. The emissions treatment system 10 includes a housing 12 with a passage 14 having an inlet 16 and outlet 18, corona discharge electrode devices 20(1)-20(2), a catalyzed electrostatic system 22, and a catalyst system 24, although the emissions treatment system 10 can comprise other numbers and types of components in other configurations. The present invention provides a number of advantages including providing systems and methods for elimination of particulate matter which are robust, efficient, durable, packagable, and maintenance-free.

Figure 1:
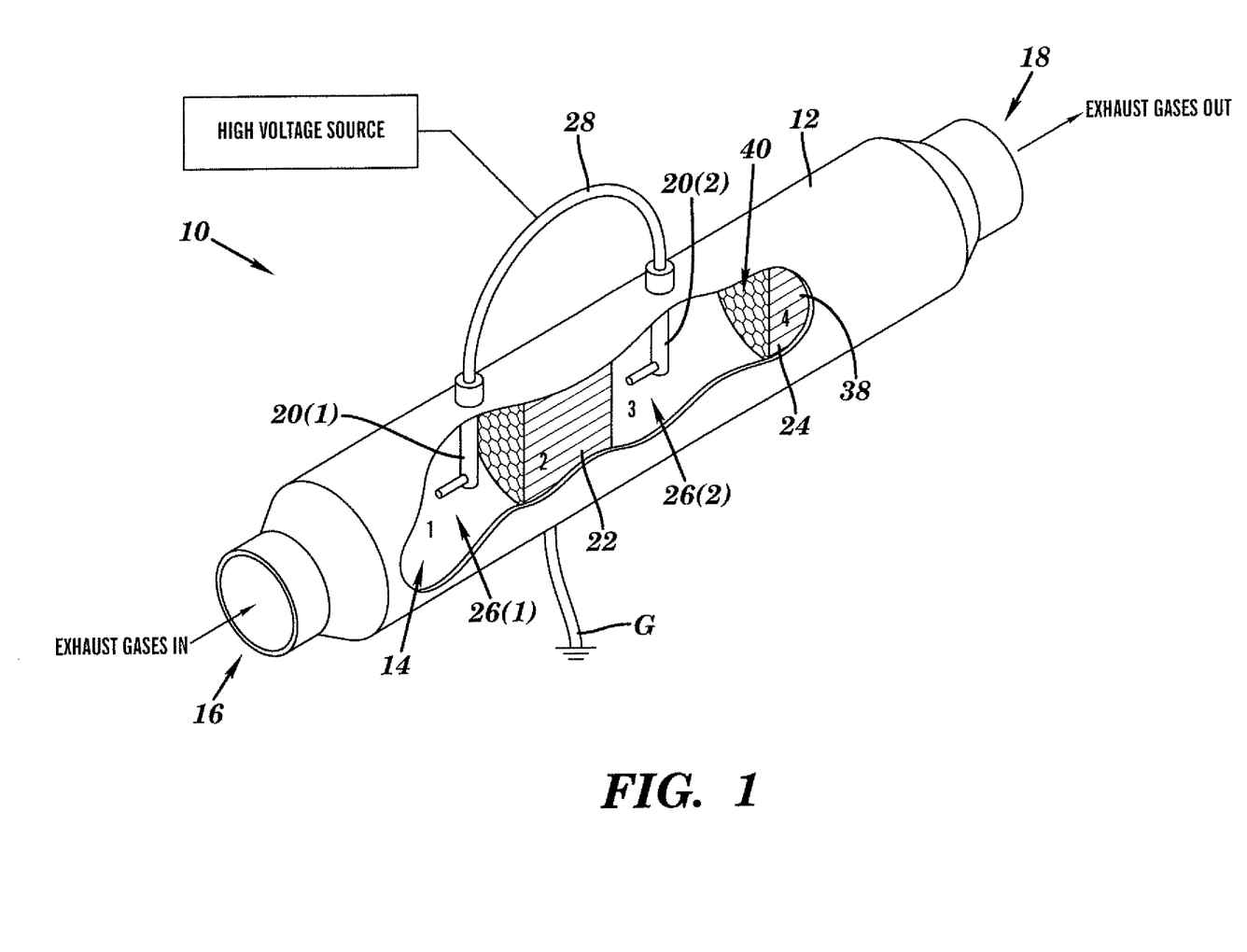
FIG. 1 is a partial perspective and partial broken away view of a emissions treatment system in accordance with embodiments of the present invention.

Referring to FIG. 1, the housing 12 defines the passage 14 which extends between the inlet 16 and the outlet 18, although the housing 12 could have other shapes and configurations with other numbers of passages with other numbers of inlets and outlets. The housing 12 has chambers 26(1) and 26(2) in passage 14 on opposing sides of the catalyzed electrostatic system 22, although the housing 12 could have other numbers and types of chambers in passage 14 in other configurations.

Figure 2:
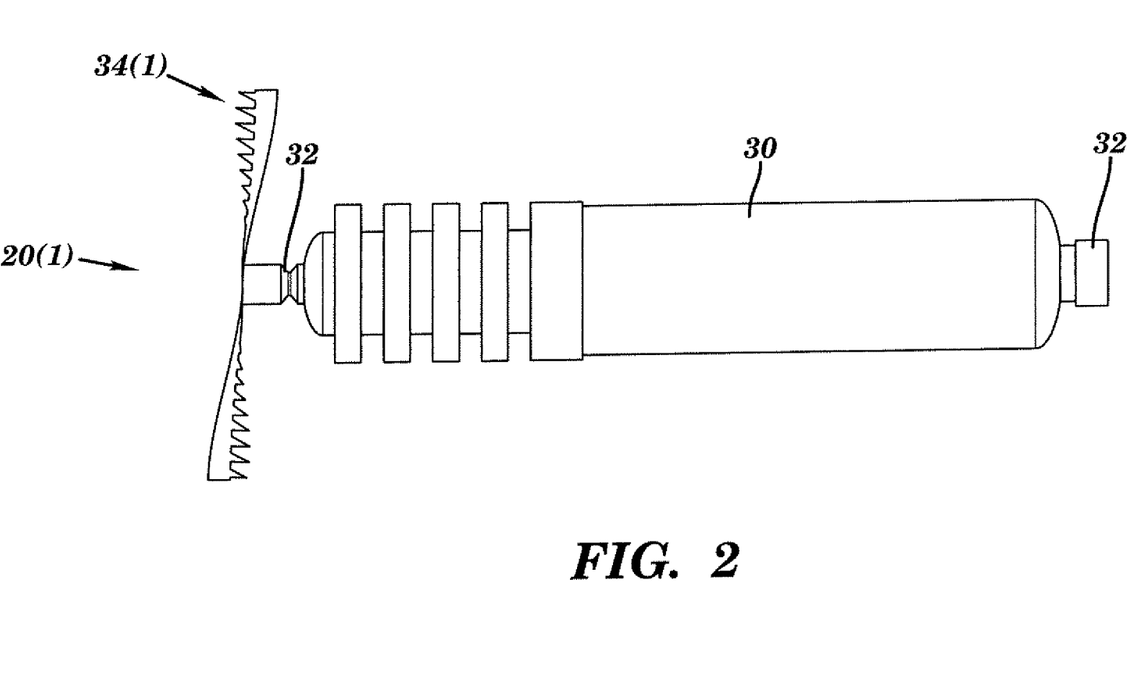
FIG. 2 is a perspective view of a corona discharge electrode device in the emissions treatment system shown in FIG. 1.
Figure 3:
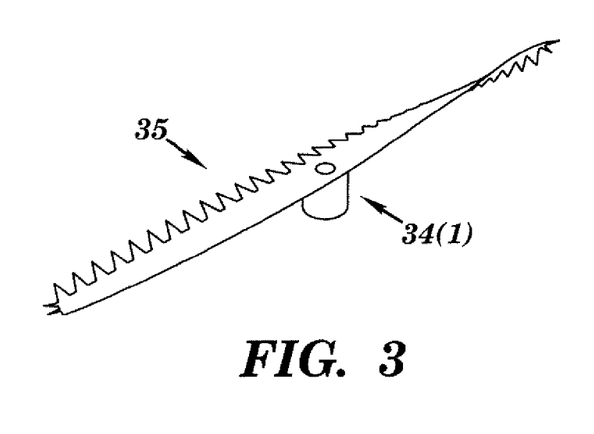
FIG. 3 is a side, perspective view of the corona probe for the corona discharge electrode device shown in FIG. 2.

Referring to FIGS. 1-3, the corona discharge electrode device 20(1) is located in the first chamber 26(1) in the passage 14 adjacent the inlet 16, although other numbers and types of devices for charging particulate matter and in other locations could be used. The corona discharge electrode device 20(1) provides a corona discharge that is used to charge particles in an exhaust stream passing through a chamber 26(1) in the passage 14 in housing 12, such as soot in diesel exhaust.

The corona discharge electrode device 20(1) includes a ceramic base 30, a conductive rod 32, and a probe 34(1), although the corona discharge electrode device 20(1) could be comprised of other types and numbers of elements in other configurations. The base 30 is formed around and insulates the rod 32 and has a threaded end which is used to secure the base 30 in an opening in the housing 12 so the probe 34(1) is disposed in the passage 14, although other types of bases made of other materials and secured to the housing in other manners can be used and other types of conductors can be used for rod 32. In these embodiments, the probe 34(1) has an elongated, rectangular shape with teeth 35 that have sharp peaks along three sides and a smooth edge along the remaining side and the probe has a twisted configuration, although the probe 34(1) could have other numbers and type of teeth along other numbers of edges and could have other shapes in other configurations. Additionally, in this embodiment the probe 34(1) is made of brass, although other types of materials could be used.

Figure 6A:
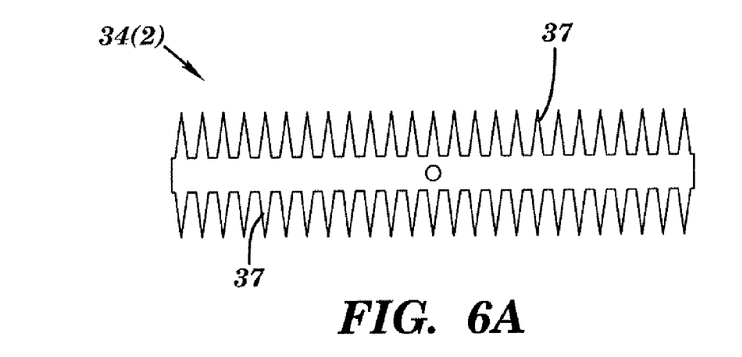
FIGS. 6A-6C are top, perspective view of other embodiments of corona probes for the corona discharge electrode device.
Figure 6B:
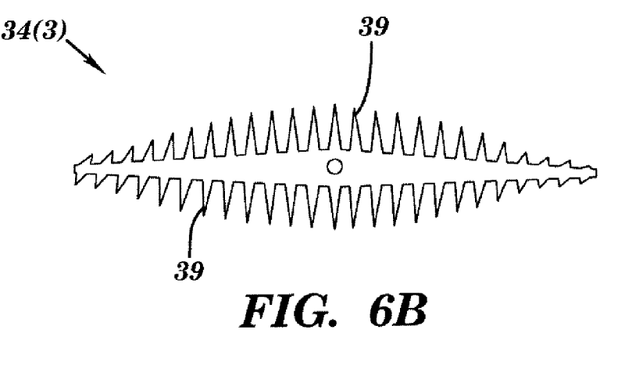
Figure 6C:
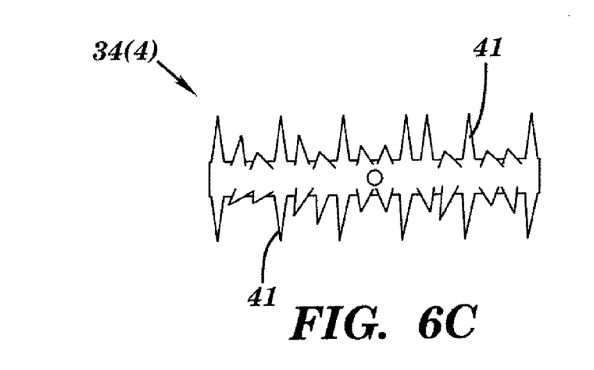

By way of example only, other embodiments of probes 34(2)-34(4) which could be used with one or both of the corona discharge electrode devices 20(1) and 20(2) are illustrated in FIGS. 6A-6C. In this embodiment, the probe 34(2) has an elongated shape with a plurality of teeth 37 on opposing elongated sides, although the probe 34(2) could have other shapes and configurations. Each of the teeth 37 have: a sawtooth shape; substantially the same overall size; a spacing between each of the teeth 37 which is substantially the same; and a direction in which each of the teeth 37 on the same elongated side extend in substantially the same direction, although the probe 34(2) could have other types and numbers of teeth, with other spacing and direction, and with other shapes and configurations on other numbers of sides.

In this embodiment, the probe 34(3) has an elongated shape with a plurality of teeth 39 on opposing elongated sides and with an overall twisted configuration, although the probe 34(3) could have other shapes and configurations. Each of the teeth 39 have: a sawtooth shape; an overall size for each of the teeth 39 which tapers down from a center towards each of the ends of the probe 34(3); a spacing between each of the teeth 39 which is substantially the same; and a direction in which each of the teeth 39 on the same elongated side extend in substantially the same direction, although the probe 34(3) could have other types and numbers of teeth, with other spacing and direction, and with other shapes and configurations on other numbers of sides.

In this embodiment, the probe 34(4) has an elongated shape with a plurality of teeth 41 on opposing elongated sides, although the probe 34(3) could have other shapes and configurations. Each of the teeth 41 have: a sawtooth shape; substantially the same overall size; a spacing between each of the teeth 41 which is substantially the same; and a direction in which each of the teeth 41 on the same elongated side extend varies between the teeth 41, although the probe 34(4) could have other types and numbers of teeth, with other spacing and direction, and with other shapes and configurations on other numbers of sides The different shapes, configurations, sizes and directions for the teeth on the probes 34(1)-34(4) improve the corona discharge from the corona discharge electrode devices 20(1) and 20(2). Unlike prior single pole, mesh type, or plate electrodes which serve a limited area of exhaust gas flow, the use of corona discharge electrode devices 20(1) and 20(2) with one of these probes 34(1)-34(4) leads to the formation of wide rectangular ionization field which covers a wide area of the passage 14 in housing 12.

Referring to FIG. 1, the corona discharge electrode device 20(2) is identical to the corona discharge electrode device 20(1) illustrated and described with reference to FIGS. 1-3, except as described herein. The corona discharge electrode device 20(2) is located in the second chamber 26(2) in the passage 14 between the catalyzed electrostatic system 22 and the catalyst system 24, although other numbers and types of discharge devices could be used. The corona discharge electrode device 20(2) provides a corona discharge in the chamber 26(2) in the passage 14 downstream from the catalyzed electrostatic system 22. The corona discharge is used to convert compounds in the exhaust stream, such as NO, to other compounds, such as $NO_2$, which can be treated by the catalyst system 24.

A high voltage power source 28 is coupled to the corona discharge electrode devices 20(1) and 20(2) and supplies power at a very high voltage between about 5 kV and 70 kV at a very low current between about 0.01 mA and 7 mA, although the power supply 28 can supply power at other voltages and currents to the corona discharge electrode device 20(1). One of the advantages of the present invention is that the system 10 works effectively with the corona discharge electrode devices 20(1) and 20(2) generating non-thermal plasma which requires less power and thus is more energy efficient.

Figure 4:
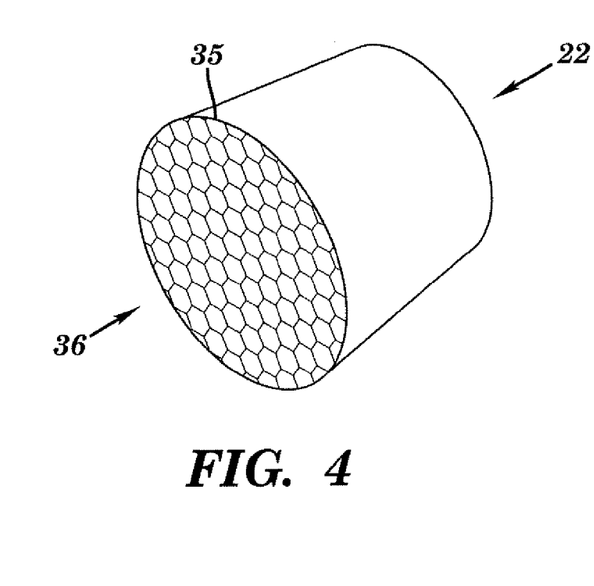
FIG. 4 is a perspective view of a section of a catalyzed electrostatic system in the emission system shown in FIG. 1.

Referring to FIGS. 1 and 4, the catalyzed electrostatic system 22 comprises a substrate core 35 which has a plurality of passages 36 that extend through, although the catalyzed electrostatic system 22 can comprise other types and numbers of components in other configurations and other types and numbers of attraction systems could be used. In this embodiment, the substrate core 35 is made of a metal with a silver coating in the passages 36, although the catalyzed electrostatic system 22 can comprise other types and numbers of components in other configurations and the substrate core and the coatings can be made of other types of materials. The catalyzed electrostatic system 22 is located in and fills the space in the passage 14 between the chambers 26(1) and 26(2) which are fluidly connected together by the passages 36, although other configurations could be used. The conductive surfaces of the catalyzed electrostatic system 22 are coupled to ground, although other types of electrically connections could be used, such as coupling the conductive surfaces of the catalyzed electrostatic system 22 to a device with an opposite charge from the charge on the particles.

The catalyzed electrostatic system 22 uses an electrostatic principal to deflect and attract charged soot particles in the exhaust stream to a surface of one of the passages 36 in the substrate core 35, although other manners for attracting the particles on other types of surfaces can be used. Additionally, the catalyzed electrostatic system 22 provides space for the conversion of soot and other particulate materials captured on the catalyzed electrostatic system 22 through oxidation so the catalyzed electrostatic system 22 can self regenerate.

Referring to FIG. 1, the catalyst system 24 includes a catalyst substrate 38 with a plurality of passages 40 and is made of a ceramic material, although the catalyst system 24 can comprise other types and numbers of components in other configurations and can be constructed with other types of materials. The catalyst system 24 is located in and fills the space of the passage 14 between the chamber 26(2) and the outlet 18 which are fluidly coupled together, although other configurations could be used. The catalyst system 24 is used to reduce or eliminate tailpipe emissions such as CO, HC and NOx with one or more reactions with catalysts in the catalyst system 24 in manners well known to those of ordinary skill in the art.

A method of reducing emissions in accordance with embodiments of the present invention will now be described with reference to FIGS. 1-4. An exhaust stream, such as diesel soot, is introduced through the inlet 16 into the chamber 26(1) in the passage 14, although other types of fluids could be introduced for treatment. Meanwhile, power supply 28 is engaged to supply power to the corona discharge electrode devices 20(1) and 20(2) in manners well known to those of ordinary skill in the art. In these embodiments, the power supplied to corona discharge electrode devices 20(1) and 20(2) is at very high voltage between about 5 kV and 70 kV with a very low current between about 0.01 mA and 7 mA, although the power can be supplied at other voltages and currents.

The high voltage applied to the corona discharge electrode device 20(1) charges carbon particles in the exhaust stream with ions repelled by the corona discharge in chamber 26(1), although other manners for charging the particulate matter in chamber 26(1) can be used. The shape and configuration of the probe 34(1) on the corona discharge electrode device 20(1) leads to the formation of an ionization field which covers a substantial portion of the chamber 26(1). The corona discharge in the chamber 26(1) also excites the gas atoms to produce highly reactive O, OH, and $NO_2$ radicals. These highly reactive radicals oxidize at least a portion of the soot particles passing through chamber 26(1) into gases, such as $N_2$, CO, $CO_2$ and $H_2O$ by way of example only.

Next, the charged particles in the exhaust stream in chamber 26(1) are directed downstream into the passages 36 in the substrate core 35 of catalyzed electrostatic system 22, although the charge particles could be directed to other types of attraction systems. The charge particles in the exhaust stream migrate to and are attracted on the conductive surfaces in the passages 36 in the substrate core 35 which are coupled to ground G, although the conductive surfaces could be coupled in other manners, such as to a device which provides an opposite charge from the charge on the charge particles. By way of example only, particle migration velocities of 0.01 to 4 ft/sec are common.

Meanwhile, the radicals, such as O, OH, and $NO_2$, generated in the chamber 26(1) are also directed downstream into the passages 36 in the substrate core 35 in catalyzed electrostatic system 22. The radicals, such as O, OH, and $NO_2$, also oxidize at least a portion of the particles attracted on the conductive surfaces in the passages 36 in the substrate core 35 to self regenerate the catalyzed electrostatic system 22. These highly reactive radicals oxidize the attracted particles into gases, such as $N_2$, CO, $CO_2$ and $H_2O$, while again self regenerating the catalyzed electrostatic surface.

Next, the high voltage applied to the corona discharge electrode device 20(2) generates a corona discharge in chamber 26(2), although other manners for generating a corona discharge or other plasma can be used. The shape and configuration of the probe 34(1) on the corona discharge electrode device 20(2) helps to lead to the formation of the ionization field which covers a substantial portion of the chamber 26(2). The corona discharge in chamber 26(2) converts any residual compounds, such as NO, in the exhaust stream from the catalyzed electrostatic system 22 into other compounds, such as $NO_2$, which can be treated by the catalyst system 24, although other manners for preparing the exhaust stream in chamber 26(2) for further treatment can also be used. Yet another function occurring in chamber 26(2) with the ionization is the oxidization of at least a portion of any remaining soot particles into gases, such as $N_2$, CO, $CO_2$ and $H_2O$ Next, the exhaust stream is provided into the passages 40 in the catalyst substrate 38 for the catalyst system 24 to reduce or eliminate tailpipe emissions, such as CO, HC and NOx, with one or more reactions with catalysts in the catalyst system 24 in manners well known to those of ordinary skill in the art. The treated exhaust stream is then output via the outlet 18 in the housing 12, although other treatments could be applied and the exhaust could be outlet in other manners.

Figure 5:
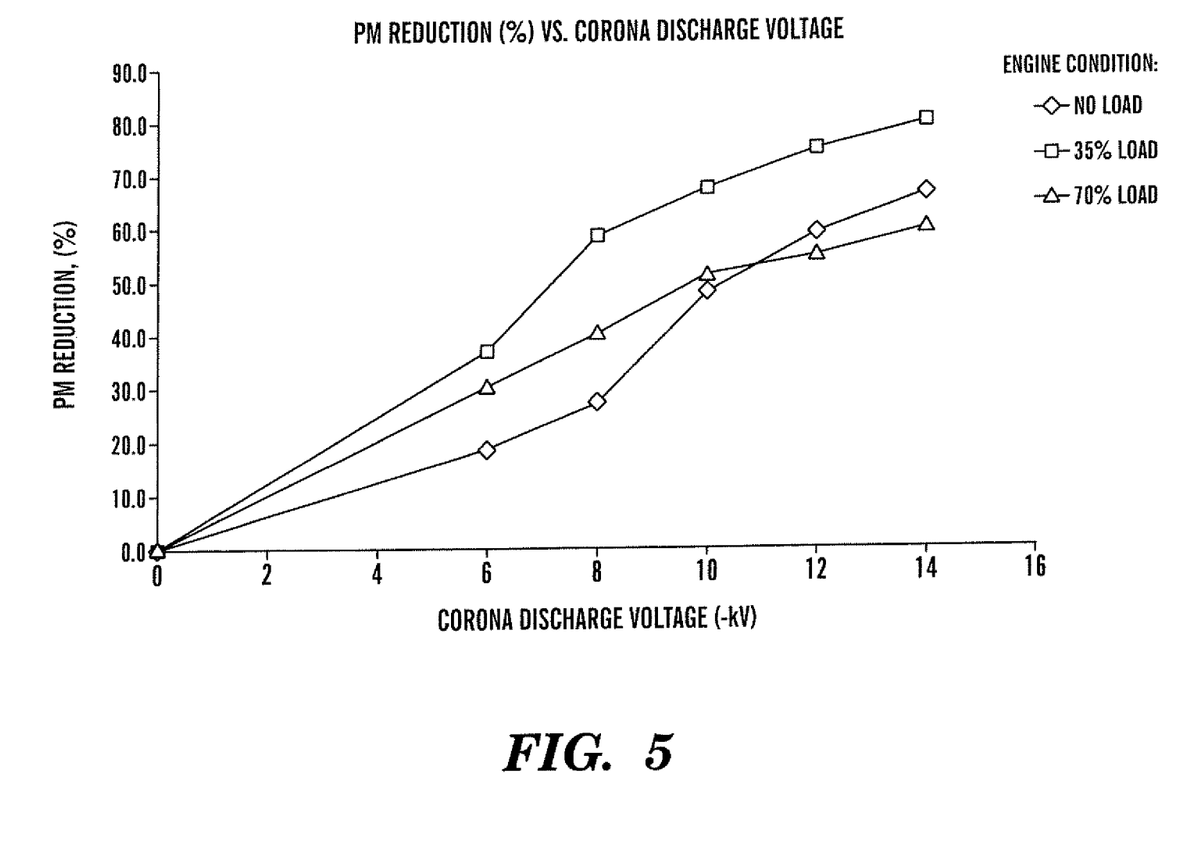
FIG. 5 is graph of experimental test results of particulate matter reduction versus corona discharge voltage.
Figure 7:
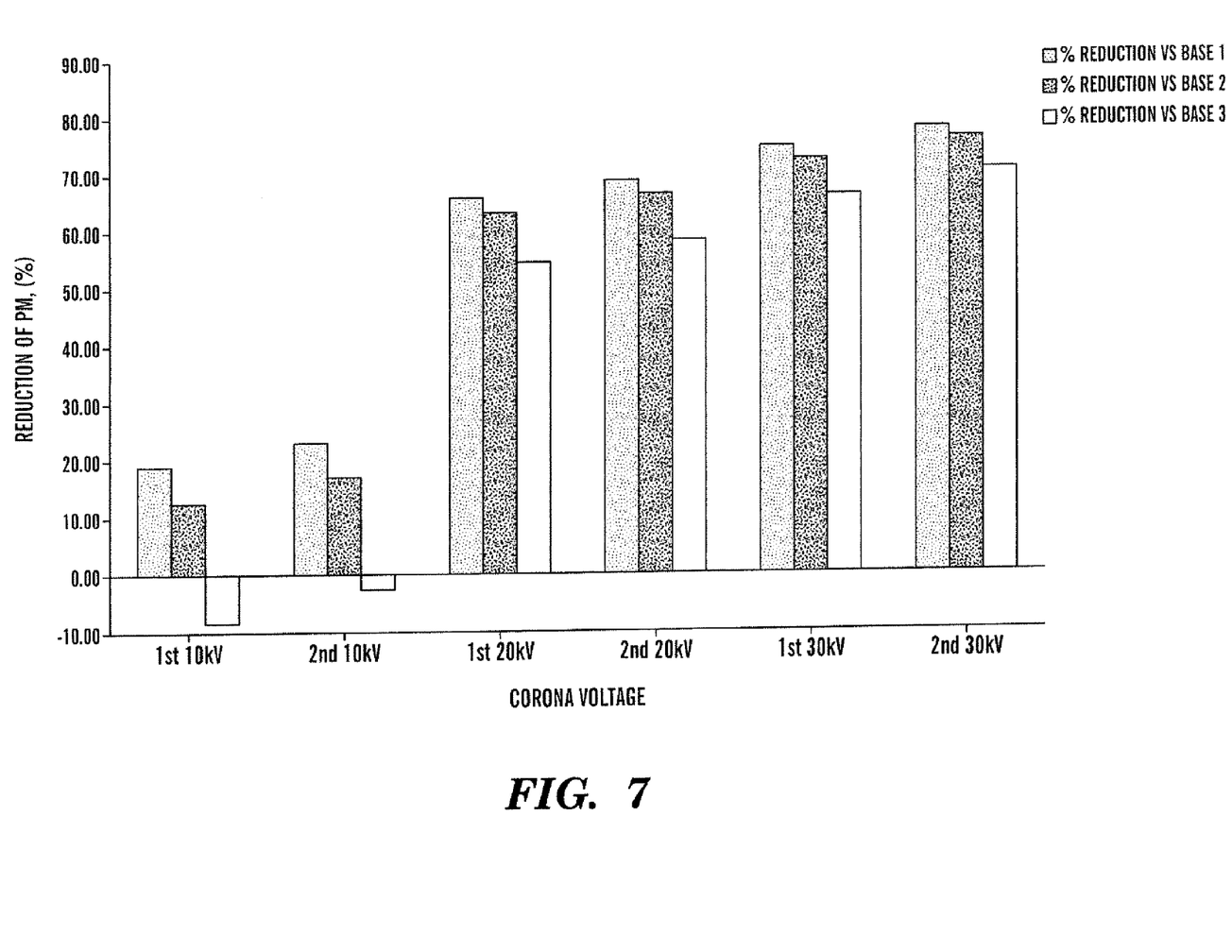
FIG. 7 is a diagram of test results of particulate matter reduction.

By way of example only, sample result from a diesel generator equipped with the system 10 is shown in FIG. 5. As illustrated, the system 10 providing a particulate matter reduction between about 37% and 80% depending upon the engine load and the level of power supplied by the power supply 28 to the corona discharge electrode devices 20(1) and 20(2). These results prove the feasibility of using non-thermal plasma with the system 10 as a viable method to reduce soot in a diesel generator and diesel engine exhaust. Additionally, by way of example only, the results from a diesel pick up truck equipped with the system 10 are also illustrated in the table shown in FIG. 7.

The present invention has a number of applications, including as a component of an emissions treatment system for automotive applications, such as off-road vehicles, distributed power systems, stationary power systems and mining systems. Other applications for the present invention, by way of example only, include removal of tar in biomass conversion and in stack gas applications.

Accordingly, the present invention provides a particulate trap system which is effective in reducing emissions, is durable, and is self-regenerating. Since the present invention works with non-thermal plasma, it is very efficient in terms of power consumption when compared to prior particle separation and trapping technologies. Another advantage of the present invention is the simplicity and effectiveness of the design of the corona probe. Yet another advantage of the present invention is the absence of precious metal such as Platinum for conversion of NO to $NO_2$. Yet a further advantage of the present invention is that the low temperature (>=100° C.) operation of the system 10 makes it very suitable for use in vehicles and systems, such as school busses, refuse trucks, construction equipment, on and off road vehicles, and generators by way of example only.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A corona discharge electrode comprising:
   a conductive probe having
   a plurality of teeth along at least one edge thereof;
   a conductive rod having two distal ends, one distal end electrically coupled to the conductive probe; and
   an insulating base formed around the conductive rod between the two distal ends, the insulating base having an integrated detachable securing mechanism adjacent one end thereof configured to detachably secure to an emissions treatment housing, wherein when the other distal end is coupled to a power source supplying a voltage in a range from 5 kV to 70 kV and a current in a range from 0.01 mA to 7 mA, the corona discharge electrode is fashioned to be maintenance-free and generate a non-thermal plasma in the emissions treatment housing.

2. The device as set forth in claim 1 wherein the conductive probe has an elongated shape and has teeth along two or more edges thereof.

3. The device as set forth in claim 1 wherein the insulating base securing mechanism comprises a theaded end thereof.

4. The device as set forth in claim 1 wherein the insulating base comprises a contoured surface at the other end thereof.

5. The device as set forth in claim 1 wherein the teeth each have substantially the same size.

6. The device as set forth in claim 1 wherein two or more of the teeth have a different size.

7. The device as set forth in claim 1 wherein one or more of the teeth have a sawtooth shape.

8. A method for making a corona discharge electrode, the method comprising:
   providing a conductive probe;
   forming a plurality of teeth along at least one edge of the conductive probe;
   coupling one distal end of a conductive rod having two distal ends to the conductive probe; and
   forming an insulating base around the conductive rod between the two distal ends, the insulating base having an integrated detachable securing mechanism adjacent one end thereof configured to detachably secure to an emissions treatment housing, wherein when the at least one electrical connector is coupled to a power source supplying a voltage in a range from 5 kV to 70 kV and a current in a range from 0.01 mA to 7 mA, the corona discharge electrode is fashioned to be maintenance-free and generate a non-thermal plasma in the emissions treatment housing.

9. The method as set forth in claim 8 wherein the conductive probe has an elongated shape and has teeth along two or more edges thereof.

10. The method as set forth in claim 8 wherein the insulating base securing mechanism comprises a theaded end thereof.

11. The method as set forth in claim 8 wherein the insulating base comprises a contoured surface at the other end thereof.

12. The method as set forth in claim 8 wherein the forming the plurality of teeth along at least one edge further comprises forming the teeth each to have substantially the same size.

13. The method as set forth in claim 8 wherein the forming the plurality of teeth along at least one edge further comprises forming two or more of the teeth to have a different size.

14. The method as set forth in claim 8 wherein the forming the plurality of teeth along at least one edge further comprises forming one or more of the teeth to have a sawtooth shape.

15. A method of making corona discharge, the method comprising:
   providing a maintenance-free electrode comprising a conductive probe having a plurality of teeth along at least one edge and a conductive rod having two distal ends, one distal end directly coupled to the conducting probe and having an insulating base formed around the conductive rod between the two distal ends, the insulating base having an integrated detachable securing mechanism adjacent one end of the insulating cover configured to detachably secure to an emissions treatment housing;
   coupling the conductive probe to at least one power source; and
   applying a voltage to the conductive probe in a range from 5 kV to 70 kV and a current at a value in a range from 0.01 mA to 7 mA to generate a non-thermal plasma in the emissions treatment housing.

16. The method as set forth in claim 15 wherein the conductive probe has an elongated shape and has teeth along two or more edges thereof.

17. The method as set forth in claim 15 wherein the insulating base securing mechanism comprises a theaded end thereof.

18. The method as set forth in claim 15 wherein the insulating base comprises a contoured surface at the other end thereof.

19. The method as set forth in claim 15 wherein the teeth each have substantially the same size.

20. The method as set forth in claim 15 wherein two or more of the teeth have a different size.

21. The method as set forth in claim 15 wherein one or more of the teeth have a sawtooth shape.

* * * * *

UNITED STATES PATENT AND TRADEMARK OFFICE
CERTIFICATE OF CORRECTION

PATENT NO.        : 8,581,480 B2
APPLICATION NO.   : 13/225104
DATED             : November 12, 2013
INVENTOR(S)       : Ali Ogut and Chen Cheng Page 1 of 1

It is certified that error appears in the above-identified patent and that said Letters Patent is hereby corrected as shown below:

In the Claims:

Column 8, Claim 3, line 29: "theaded" should be --threaded--

Column 8, Claim 10, line 60: "theaded" should be --threaded--

Column 10, Claim 17, line 9: "theaded" should be --threaded--

Signed and Sealed this
Seventh Day of January, 2014

Margaret A. Focarino
*Commissioner for Patents of the United States Patent and Trademark Office*